June 17, 1958 L. C. MERRILL 2,839,614

MAGNETIC RECORDING HEAD

Filed June 18, 1953

INVENTOR
Leslie C. Merrill
BY
Roland A. Anderson
ATTORNEY 2,839,614

MAGNETIC RECORDING HEAD

Leslie C. Merrill, Lisle Township, Du Page County, Ill., assignor to the United States of America as represented by the United States Atomic Energy Commission Application June 18, 1953, Serial No. 362,631

4 Claims. (Cl. 179—100.2)

The present invention relates to magnetic recording devices, and more especially to novel electromagnetic means for simultaneous recording of a plurality of signals within a small space on a magnetically sensitized medium.

In the usual arrangement of the prior art, the medium is passed over one end of the air gap between confronting pole pieces of an electromagnet, so that a portion of the magnetic flux passes through the tape. Thus, small spots on the medium are magnetized, and may be thought of as discrete, magnetic dipoles. One problem in obtaining a large information storage capacity across the tape width has been overcome by forming several discrete recording heads or magnets into a single unit, and passing the recording medium adjacent the unit so as to record information in a line across the medium. Such units are known as multiple head assemblies, as contrasted with single recording heads. Such multiple heads have generally comprised merely an aggregation of juxtaposed single magnets held in physical proximity, the separate complete units being insulated by suitable spacers. The number of complete magnets that can be stacked together in a given tape width is limited by the dimensions of the individual heads comprising the aggregate.

However, I have found that the apparent limitations characteristic of multiple heads of the prior art can be overcome. According to the present invention, the two pole pieces of a conventional electromagnet are separated by a common center pole piece disposed in a plane substantially perpendicular to the travel of the recording medium and the two pole pieces are no longer confronting, but are staggered. They are held in a mounting body, and are arranged in lateral sequence alternately on one side and the other of the centerpiece to define a series of recording air gaps. By such arrangement no part of any pole piece on one side of the centerpiece lies directly opposite a pole piece on the other side of the centerpiece. Cross-talk between adjacent heads is minimized by providing a non-magnetic centerpiece having therein laminated inserts of a material offering a very low reluctance to the magnetic flux. These inserts are arranged opposite each magnet pole piece so that very little of the flux from one head will stray to the field of the adjacent pole piece across the non-magnetic centerpiece.

Accordingly, it is the primary object of my invention to provide a novel multiple recording assembly, whose chief virtue is the ease with which the track geometry may be precisely repeated from assembly to assembly when more than one assembly is to be used on the same recording medium. A further object of my invention is to increase the memory capacity of a magnetic recording system by providing a multiple recording head assembly capable of producing a greater number of discrete tracks of recorded information per unit width than has heretofore been possible.

Another object of my invention is to provide a multiple recording head assembly wherein the possibility of cross-talk between adjacent channels is minimized.

Other objects and advantages of my invention will be apparent from the following detailed description of a preferred embodiment thereof, when read in connection with the appended drawings, in which.

Figures 1, 2, 3, 4:
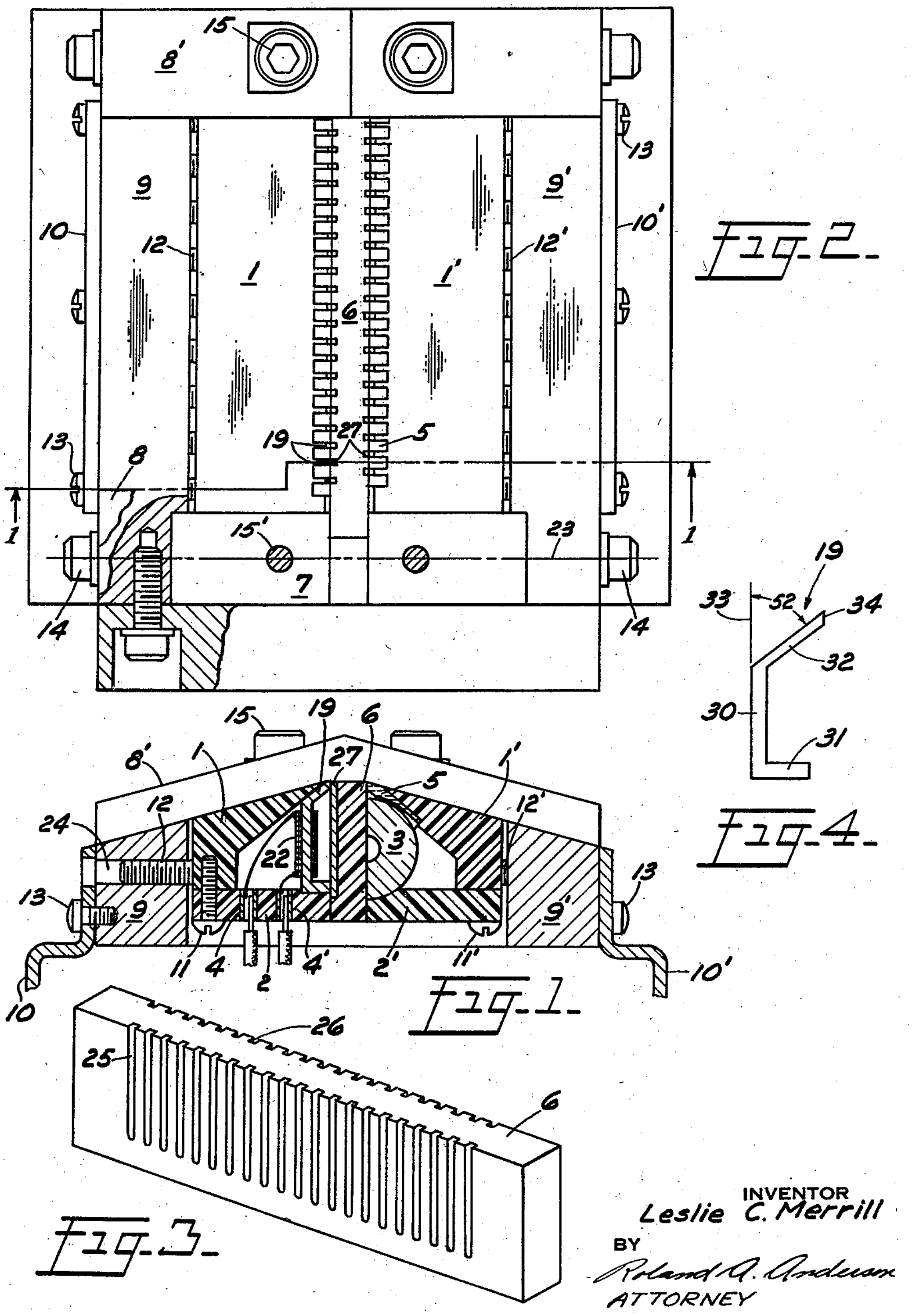
Fig. 1 is a partially cut away side view of a preferred form of my multiple recording head.
Fig. 2 is a plan view of my assembled recording head.
Fig. 3 is a detailed drawing of the centerpiece interposed between the two assemblages of stacked pole pieces in my novel recording head.
Fig. 4 is a detailed drawing of one of the laminations forming the magnet of Fig. 1.

Referring now to Figs. 1 and 2, the head assembly comprises identical body sections 1, 1', preferably of fine grade linen base Bakelite, which are fastened to the head base 2 by screws 11, 11'. Base 2 may also preferably be linen Bakelite. The top of the body sections is preferably first machined flat, then ground to a 15° angle, as shown, after the head is assembled. One of the magnets 19 is exposed in the cut away section to the left of centerpiece 6 and shown in detail in Fig. 4. The magnets may preferably be laminated, each lamination being a blank of .008 inch Mu-metal, flattened and heat-treated. The four laminations preferably used may be assembled with Araldite XV, a liquid resin solution distributed by the CIBA Company, New York, N. Y. Magnet coil 22 may comprise 450 turns of #42 Formvar wire, coated with an insulating varnish, the ends of the coil being brought out through eyelets 4, 4' disposed in passageways through base 2. Semicircular Mu-metal shields 3 are interleaved between the pole pieces on both sides of centerpiece 6 to physically separate and also to shield adjacent magnets by providing a low-reluctance path for stray flux before it reaches the adjacent magnets. Wear strips 5, preferably of Lavite, are cut to fit into recesses in body members 1, 1', and are provided with a tapered, upper portion to conform with the top surface of the body members 1, 1', and a rounded lower edge to receive the upper periphery of shields 3. The ends of the Lavite wear strips abut against centerpieces 6 between the magnet pole pieces, and absorb most of the wear caused by the moving tape. Centerpiece 6, preferably of linen base Bakelite, is held firmly between base sections 2, 2' and also between the remainder of the substantially identical, but offset, sections of the head assembly.

A pair of stainless steel holder end plates 7, 7' are provided with centrally-located vertical slots to receive the neck of centerpiece 6 and are vertically drilled and tapped to receive cap screws 15, 15'. Blind holes are drilled and tapped horizontally along the centerline 23 to receive additional screws 14, 14'. The top surfaces of the end plates are ground to conform with the 15° inclination from horizontal of the the body members 1, 1'. Tape guides 8, 8' may be stainless steel V-shaped members conforming with the inclined top surfaces of the end plates 7, 7', body members 1, 1', and side plates 9, 9', and the squared top of centerpiece 6. They may be drilled to receive cap screws 15, 15', which are provided with lock-washers, not shown. Holder side plates 9, 9' may be stainless steel blocks having the upper surfaces ground to conform with the 15° inclination of body members 1, 1'. Plates 9, 9' may be provided with a series of aligned drilled and tapped apertures 24 for receiving set screws 12, 12'. The innermost end of the set screws abuts against the end face of body member 1, urging it toward the centerpiece 6. Each side plate may be provided with three blind drilled and tapped holes for receiving screws 13, which fasten the side plates to aluminum brackets 10, 10'. The brackets 10 and 10' are provided with a series of aligned apertures registering with apertures 24 so that set screws 12 may be adjusted therethrough.

Referring now to Fig. 3, the centerpiece 6 may preferably be formed from a rectangular block of linen base Bakelite. It is provided with a series of equally spaced, staggered slots 25, 26, on opposite lateral surfaces, the slots extending from the top down substantially three-fourths of the vertical dimension of the block. By the staggering arrangement, no slot lies directly opposite any other slot. The slots may preferably taper substantially 2° radially inward from the top downward, and may typically be .032 inch deep at the top and .032 inch wide throughout. Corresponding edges of each slot on the same lateral surface may be .092 inch apart. The slots receive conductors 27, which are preferably made up of laminations of .008 inch Mu-metal, flattened and heat treated. The centerpiece and laminations should be soaked in a liquid resin solution, such as Araldite XV, and the proper number of laminations, preferably four, inserted fully and firmly into the slots. After the resin has set, the top surface of the centerpiece should be ground and honed smooth. Then, at least, the upper portion of all laminations should be plated with a hard chrome coating, substantially the top .25 inch of all laminations being a suitable portion for plating. A plating thickness of .0005 inch is preferred.

The magnet 19 of Fig. 4 may comprise four laminations cemented together as above described. Each lamination is a Mu-metal blank, which may be .0077 inch thick and .492 inch in length along portion 30, and .25 inch along leg 31. Leg 32 may be inclined 52° from the vertical reference line 33 and extend 5/16 inch horizontally from that reference. The overall vertical dimension may be .736 inch, with a pole face 34 of .04 inch.

After the entire head is assembled together as shown in Fig. 1, it is potted with a liquid resin, preferably Hysol #6020 Base and #6020 Hardener, distributed by Houghton Laboratories, Inc., Olean, New York. Then it may be ground smooth and cleaned before using.

In operation, a sensitized magnetic tape may be drawn across the flat surface of the top of the centerpiece 6 between the tape guides 8, 8'. The recording signal may be supplied to the magnets through the opposite ends of each of the coils 22. The magnetic flux exists across the chrome coating on inserts 27, between the pole piece 19 and the inserts or laminations.

Shields 3 prevent cross-talk between adjacent channels, while the staggering of the recording gaps on opposite sides of the centerpiece provides for a large increase in the number of separate channels that can be provided per unit tape width. Moreover, with the present arrangement, when the assembly is worn down by tape travel so that the recording gap becomes too large, or operation is otherwise affected, the top of the centerpiece may be ground flat, and the top surfaces of body member 1, 1' and wear strips 5, 5' may be ground to the original 15° taper, thus greatly increasing the useful life of the head assembly.

While the present assembly has been especially described in connection with magnetic tape, it is apparent that the novel arrangement herein disclosed is equally applicable, with suitable modifications, to magnetic drums and the like, as well. Likewise, it will be apparent to those skilled in the art that the common centerpiece need not be of the preferred construction described, but might take other configurations also. For example, it might be simply a magnetic iron block or wedge disposed between staggered magnets and chrome plated at the upper surfaces which confront the magnet pole pieces to establish the recording gap. Other parts of the above-described assembly could obviously be altered by those skilled in the art without departing from the spirit and teachings of my invention.

Having thus described my invention, I claim:

1. A multiple magnetic recording head assembly comprising a non-magnetic centerpiece provided with only first and second groups of spaced slots, one group on either side thereof, two groups of electromagnets, one group being disposed on each side of said centerpiece, said magnets within each group being aligned along said centerpiece, first and second side pieces disposed in confronting relation on either side of said centerpiece and provided with respective upper bearing surfaces, said side pieces urging said magnets toward said centerpiece, two groups of equally spaced ferromagnetic inserts disposed within said centerpiece slots, each insert being arranged in spaced, confronting relationship to respective first poles of said magnets to define recording gaps therewith and in contact with respective opposite poles of said magnets to complete the magnetic circuits, said magnets and corresponding inserts being arranged in staggered relation along said centerpiece to provide a series of parallel recording tracks.

2. A multiple magnetic recording head assembly comprising a non-magnetic upstanding centerpiece; first and second non-magnetic base members disposed in confronting relation on opposite sides of said centerpiece and provided with respective rows of adjacent horizontal slots; a plurality of interleaved electromagnets and ferromagnetic spacers carried in said horizontal slots with said spacers in said first base member lying in the same transverse plane as said electromagnets in said second base member; first and second side members fixed to corresponding base members and each including an upstanding section and an inclined, tapered section, portions of the lower surfaces of said tapered sections contacting correspondingly inclined surfaces of said electromagnets; and a plurality of ferromagnetic inserts disposed in staggered relationship in opposite walls of said centerpiece and contacting corresponding electromagnets adjacent said base members, at least that portion of said inserts confronting said electromagnets adjacent the top of said centerpiece being coated with a non-magnetic material contacting said electromagnets to define recording gaps.

3. A multiple magnetic recording head assembly comprising a non-magnetic upstanding centerpiece; first and second non-magnetic base members disposed in confronting relation on opposite sides of said centerpiece and provided with respective rows of adjacent horizontal slots; a plurality of interleaved electromagnets and ferromagnetic spacers carried in said horizontal slots with said spacers in said first base member lying in the same transverse plane as said electromagnets in said second base member; first and second side members fixed to corresponding base members and each including an upstanding section and an inclined, tapered section, portions of the lower surfaces of said tapered sections contacting correspondingly inclined surfaces of said electromagnets, said tapered sections each being provided with a transverse row of slots disposed between said portions; a plurality of wear-resistant, non-magnetic bearing members disposed within said last-named slots to contact a recording medium; and a plurality of ferromagnetic inserts disposed in staggered relationship in opposite walls of said centerpiece and contacting corresponding electromagnets adjacent said base members, at least that portion of said inserts confronting said electromagnets adjacent the top of said centerpiece being coated with a non-magnetic material contacting said electromagnets to define recording gaps.

4. A multiple magnetic recording head assembly comprising a non-magnetic upstanding centerpiece provided with a plurality of parallel vertical grooves disposed in staggered relation in opposite walls and with a flat top surface; first and second non-magnetic base members disposed in confronting relation on opposite sides of said centerpiece and provided with respective rows of adjacent horizontal slots; a plurality of vertically disposed, interleaved electromagnets and ferromagnetic spacers carried in said horizontal slots with said spacers in said first base member lying in the same transverse plane as said electromagnets in said second base member; first and second side members fixed to corresponding base members and each including an upstanding section and an inclined, tapered section, portions of the lower surfaces of said tapered sections contacting correspondingly inclined surfaces of said electromagnets, said tapered sections each being provided with a transverse row of slots disposed between said portions; a plurality of wear-resistant, non-magnetic bearing members disposed within said last-named slots to contact a recording medium; ferromagnetic inserts disposed in staggered relationship in opposite walls of said centerpiece and contacting corresponding electromagnets adjacent said base member slots, at least that portion of said inserts confronting said electromagnets adjacent the top of said centerpiece being coated with a non-magnetic material contacting said electromagnets to define recording gaps, a pair of end plates, each plate being provided with a central vertical slot enclosing opposite ends of said centerpiece; a pair of side plates disposed on opposite sides of said centerpiece outside said side members and fixed to said end plates, and means extending through said side plates to urge said side members inward toward said centerpiece.

References Cited in the file of this patent

UNITED STATES PATENTS

| | | |
|---|---|---|
| 2,618,709 | Eckert | Nov. 18, 1952 |
| 2,689,274 | Saeger | Sept. 14, 1954 |